United States Patent [19]

Praxl et al.

[11] 4,180,557

[45] Dec. 25, 1979

[54] METHOD FOR DETOXIFYING PHOSPHIDE CONTAINING PESTICIDES

[75] Inventors: Werner Praxl, Rimbach; Reiner Ehret, Weinheim, both of Fed. Rep. of Germany

[73] Assignee: Dr. Werner Freyberg, Laudenbach, Fed. Rep. of Germany

[21] Appl. No.: 843,420

[22] Filed: Oct. 19, 1977

[30] Foreign Application Priority Data

Oct. 25, 1977 [DE] Fed. Rep. of Germany ....... 2648335

[51] Int. Cl.[2] ...................... A01N 17/02; C01B 25/08; A01N 11/00

[52] U.S. Cl. ...................................... 424/10; 423/299; 424/128; 424/40

[58] Field of Search .................. 423/299; 424/128, 40, 424/10

[56] References Cited

U.S. PATENT DOCUMENTS

| | | | |
|---|---|---|---|
| 3,719,751 | 3/1973 | Rauscher et al. | 424/128 |
| 3,917,823 | 10/1975 | Kapp | 424/128 |
| 3,994,770 | 10/1976 | Lausch | 162/8 |

FOREIGN PATENT DOCUMENTS 2206494 12/1973 Fed. Rep. of Germany .

*Primary Examiner*—Alan L. Rotman
*Assistant Examiner*—Robert C. Whittenbaugh
*Attorney, Agent, or Firm*—Cooper, Dunham, Clark, Griffin & Moran

[57] ABSTRACT

Method for detoxifying phosphide containing pesticides by treatment with aqueous alkaline reagents optionally containing oxidants and/or surfactants.

12 Claims, No Drawings

METHOD FOR DETOXIFYING PHOSPHIDE CONTAINING PESTICIDES

Pests such as insects, mites and rodents living on stored food or crops, are controlled to a large extent by compositions comprising as active ingredient phosphides of earth metals and alkaline earth metals, such as magnesium, calcium, and aluminum phosphide. These compounds react with water, normally present as moisture in air or cereal grains, to release hydrogen phosphide, a respiratory poison capable of killing such pests.

In general, the active compositions will contain other additives besides phosphides. Hydrophobic or film-forming substances may be added in order to adjust the reaction rates, and self-ignition of the generated hydrogen phosphide may be suppressed by substances which release $CO_2$ and/or $NH_3$. Commonly employed hydrophobic additives are, e.g., paraffin, metal stearate and other metal soaps, silicones and synthetic resins in amounts from 1% to 20% by weight based on the total weight of the final product. Self-ignition is suppressed by adding, for example, ammonium carbonate, ammonium carbamate, urea or sodium bicarbonate in amounts from 10% to 50% by weight. When the compositions are used in the form of pellets, tablets, or other molded forms they will normally contain compacting agents of various types, e.g., silicon dioxide, talcum, calcium phosphate, polyethylene glycol, organic fatty acids and fatty alcohols in amounts from about 0.5% to 4% by weight. Powder compositions are usually employed in bags prepared from gas and steam permeable materials such as specially treated paper or non wovens. When employing the above pesticidal compositions, it has been observed that the phosphides are not always completely decomposed. The spent compositions may still contain minor amounts of unreacted phosphides which often cause problems in the handling and disposal of such waste material. Even treating the waste with water will not always produce satisfactory results, because the materials with which the products are formed, or the containers, such as paper bags, in which they are contained are normally hydrophobic. Thus, the residues repel water and resist decomposition.

It has been suggested to admix the water required for treating the waste material with an oxidizing substance or blend of substances at a pH of less than 7. Chromic acid as well as oxidants in admixture with citric acid has been suggested. However, this method has several disadvantages. A principal reason for this is that the release of hydrogen phosphide, a prerequisite for its oxidation, is only accomplished in a complete manner by using strong mineral acids such as $H_2SO_4$ and HCl. These acids are very hazardous. Their use is not advisable except by carefully trained experts.

Moreover, citric acid will convert only insignificant amounts of the residual phosphides normally encountered. After treatment with citric acid and an oxidant, spent commercial compositions may still contain unreacted phosphide in concentrations of e.g. 1% to 2% by weight. Even chromic acid will not completely remove such undesirable residues.

It is an object of the present invention to overcome these disadvantages and to provide a method by which spent pesticides which release hydrogen phosphide may be destroyed safely and completely within a short period of time.

The invention, therefore, provides a method of detoxifying phosphide-containing pesticides by treating the residues remaining after formation of the hydrogen phosphide gas with an aqueous alkaline reagent at a pH of at least 8, preferably above 10.

Examples of especially suited alkalizing substances are: hydroxides of alkali and alkaline earth metals such as NaOH, KOH and $Ca(OH)_2$; $NH_4OH$ and water-soluble organic amines; tertiary alkali metal salts of phosphoric acid, especially $Na_3PO_4$ and $K_3PO_4$; alkali metal carbonates such as $Na_2CO_3$, as well as sulfides of alkali metals and $(NH_4)_2S$.

The hydrogen phosphide released by the above agents is converted into innocuous compounds in a manner known per se and with the aid of suitable oxidants.

Suitable oxidants are: hypochlorites such as $Ca(OCl)_2$; organic chlorine compounds such as p-toluenesulfone chloramide-Na, hexachloro melamine and chloroamine, dichloro dimethyl hydantoin as well as chlorinated cyanuric acid and its compounds, e.g., sodium dichloro isocyanurate; permanganates such as $KMnO_4$, and peroxides such as $Na_2O_2$.

Alkaline reagents which are also oxidants are especially preferred. Such reagents are capable of releasing and concurrently destroying hydrogen phosphide. A presently preferred example of such compounds is chlorinated trisodium phosphate (i.e., a commercial trisodium-ortho-phosphate/sodium hypochlorite double salt). It is readily available commercially.

A convenient means of following the course of the reaction is to add a redox indicator to the water used in treating the pesticide residues. A color change will indicate when the oxidant(s) present are no longer effective whereupon additional oxidant may be added to the water.

For improved wetting, conventional surface active substances may advantageously be added to the water, e.g. anion active tensides such as salts of carboxylic acids, sulfuric acid esters, alkyl and alkaryl sulfonates and phosphate esters of ethyleneoxide adducts, as well as surface active fluorine compounds; non-ionic wetting agents such as ethyleneoxide adducts, esters, glycerides and alkylamides of fatty acids, or cation-intensive tensides or quaternary ammonium compounds. The amounts employed are normally about 0.1% to 3% by weight, although the value is not critical.

When carrying out the process of the invention, alkaline substances, oxidant and wetting agent, each of which may be present in liquid and/or solid form, are added to the water. Heating may be advisable in order to speed up the process. The pesticide residues to be destroyed are then treated with the solution, preferably with vigorous stirring. The reaction normally will be complete after a few hours.

Surprisingly, it has been found that practically all phosphide residues will be converted when the substances described above are employed in accordance with the process of the invention. Only traces of $PH_3$ in the range of about $10^{-2}$% to $10^{-3}$% by weight were found after such treatment.

Moreover, it has been found that $Na_3PO_4$, and especially alkaline digesting agents for paper, will lead to additional advantageous results.

These substances will wet the powdery residues of phosphide-containing pesticides immediately and convert them. Within a short time, they will also wet and destroy paper which has been especially treated to be hydrophobic. Such treated paper is employed to a steadily increasing extent as packing material or container for such pesticides and heretofore could not be wetted rapidly and completely enough by known agents and processes so that contact of the agents with the pesticide residues was prevented. Especially suited for the purposes of the present invention are alkali metal phosphates adjusted to a pH of about 12 and containing about 0.1% to 3% of a cation-active substance.

The following non-limiting examples are given by way of illustration only.

EXAMPLE I

Under stirring, 8 parts of $Ca(OH)_2$ were added to 100 parts of water. The pH of the resulting solution was 11.1.

This solution was used to treat 30 parts of a commercial aluminum phosphide composition from which most of the hydrogen phosphide gas had evolved, but still contained 1.7% of $PH_3$.

The mixture was allowed to stand for 3 hours with periodic stirring. After this time, the phosphide composition contained less than 0.02% hydrogen phosphide.

EXAMPLE II 10 parts of NaOH were dissolved in 100 parts of water to form a solution with a pH of 13.1.

Subsequently, 30 parts of an aluminum phosphide composition containing 1.85% of $PH_3$, and 0.3 parts of Atlox 3025, a non-ionic wetting agent on the basis of a polyoxyalkylene alkyl ether-urea complex, were stirred into the solution.

After standing for 3 days, the $PH_3$ content was less than 0.001%.

EXAMPLE III

There was produced a 1 percent aqueous solution of a commercial digesting agent for paper, essentially consisting of sodium phosphate adjusted to pH 12 and a quaternary ammonium compound in a ratio of 99:1. Into 300 parts of this solution a bag of Detia Gas ExB, a commercial aluminum phosphide containing composition in bag form containing a residual content of $PH_3$ of 1.65%, was added. The batch was left standing for two days with occasional stirring. During this time the paper bag decomposed into single fragments so that an unhindered contact between the phosphide and the alkaline solution was possible. At the end of this period the phosphide residues contained less than 0.002% $PH_3$.

EXAMPLES IV–X

The attached table summarizes the results of additional examples conducted in accordance with the procedure of Example I.

TABLE

| Example | Composition of the pesticide | $PH_3$ content before treatm. | Alkaline substance used | Period of action | $PH_3$ content after treatment |
|---|---|---|---|---|---|
| 4 | 70% AlP techn.<br>14% Urea<br>15% Ammonium carbamate<br>1% Polypropylene wax | 2.05% | KOH, 10% | 3 days | less than 0.001% |
| 5 | 70% AlP techn.<br>26% Urea<br>4% Aluminium stearate | 1.86% | KOH, 8% | 24 hours | 0.0013% |
| 6 | 70% AlP techn.<br>26% Ammonium carbamate<br>4% Zinc stearate | 2.25% | $Na_2CO_3$, 10% | 2 days | 0.035% |
| 7 | 70% AlP techn.<br>28% NaCl<br>2% Paraffin | 1.76% | $Na_3PO_4$, 10% | 24 hours | 0.026% |
| 8 | 55% $Mg_3P_2$ techn.<br>35% Ammonium carbamate<br>10% Aluminium stearate | 0.27% | $Na_3PO_4$, 10% | 2 hours | 0.045% |
| 9 | 60% AlP techn.<br>38% Urea<br>2% Stearic acid | 1.52% | $K_3PO_4$, 10% | 2 days | 0.030% |
| 10 | 98% $Ca_3P_2$ techn.<br>2% Magnesium stearate | 1.87% | NaOH, 10% | 3 hours | 0.095% |

We claim:

1. A method of detoxifying residues from phosphide containing phosphides of earth metals and alkaline earth metals which comprises treating such residues with water to which sufficient alkaline reagent has been added to produce a pH of at least 8.

2. A method as in claim 1 wherein the pH is at least 10.

3. A method as in claim 1 wherein the water additionally contains an oxidant for hydrogen phosphide.

4. A method as in claim 3 wherein the water additionally contains a surfactant.

5. A method as in claim 1 wherein the alkaline reagent is selected from the group consisting of alkali and alkaline earth metal hydroxides, ammonia solution, water soluble organic amines, tertiary alkali metal salts of phosphoric acid, alkali metal carbonates, ammonium and alkali metal sulfides, and mixtures thereof.

6. A method as in claim 2 wherein the alkaline reagent is selected from the group consisting of alkali and alkaline earth metal hydroxides, ammonia solution, water soluble organic amines, tertiary alkali metal salts of phosphoric acid, alkali metal carbonates, ammonium and alkali metal sulfides, and mixtures thereof.

7. A method as in claim 5 wherein the alkaline reagent is selected from the group consisting of sodium hydroxide, potassium hydroxide, calcium hydroxide, tertiary sodium phosphate, tertiary potassium phosphate, sodium carbonate and ammonium sulfide.

8. A method as in claim 6 wherein the alkaline reagent is selected from the group consisting of sodium hydroxide, potassium hydroxide, calcium hydroxide, tertiary sodium phosphate, tertiary potassium phospate, sodium carbonate and ammonium sulfide.

9. A method as in claim 1 wherein the alkaline reagent is also an oxidant for hydrogen phosphide.

10. A method as in claim 9 wherein the alkaline reagent is chlorinated trisodium phosphate.

11. A method as in claim 3 wherein the oxidant is selected from the group consisting of alkali and alkaline earth metal hypochlorites, organic chlorine compounds, permanganates, peroxides and mixtures thereof.

12. A method as in claim 4 wherein the surfactant is an anion active or non-iogenic wetting agent.

* * * * *